Dec. 21, 1954  J. M. COYNER  2,697,414
NIPPLE ATTACHMENT FOR FEEDER PAILS
Filed Nov. 6, 1952
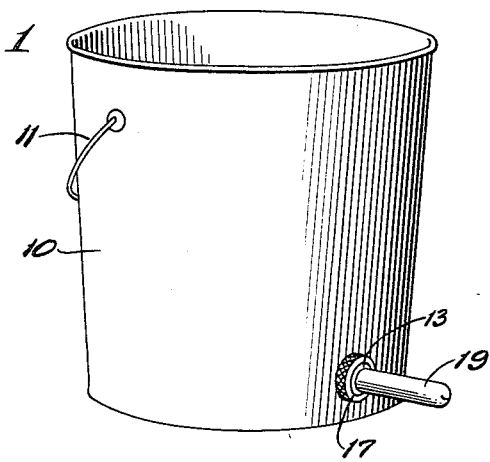
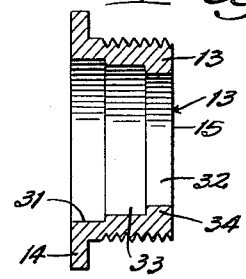
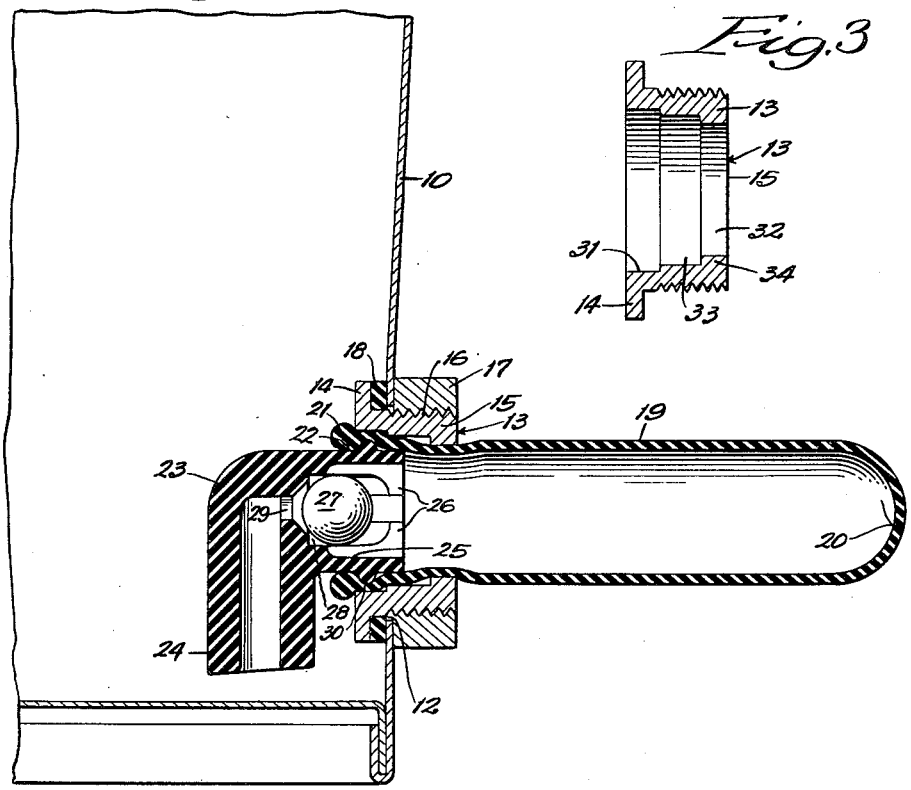
INVENTOR:
James M. Coyner,
BY
Dawson, Tilton & Graham,
ATTORNEYS.

United States Patent Office 2,697,414
Patented Dec. 21, 1954

2,697,414

NIPPLE ATTACHMENT FOR FEEDER PAILS

James M. Coyner, Madison, Wis.

Application November 6, 1952, Serial No. 318,985

5 Claims. (Cl. 119—71)

This invention relates to a nipple-equipped container or feeder pail. The structure is highly useful in the feeding of calves and other livestock, etc.

An object of the invention is to provide a nipple-equipped container of sturdy construction providing means for firmly anchoring a nipple in position while at the same time freeing it for removal or cleaning, etc. with a minimum of effort. A further object is to provide an assembly structure which stiffens the pail while at the same time providing a buffer for the calf which will prevent injury to the calf. Yet another object is to provide a ferrule structure in combination with a nipple and assembly structure, the ferrule having a configuration effective in anchoring the nipple therein while at the same time enabling the nipple to be drawn rearwardly through the ferrule when it is desired to remove the nipple. A still further object is to provide in such a structure a gooseneck tube or elbow effective in draining every drop from the pail while also permitting the use of assembly means which may be shipped in knocked-down arrangement. A further object is to provide a tube structure providing an outer bead which prevents the assembly from pulling through while at the same time having an inner bead which keeps the valve in place. Yet another object is to provide in combination with a ferrule structure a threaded outer portion adapted to receive a composition nut which may be readily screwed into place to lock the assembly firmly within the pail while at the same time permitting ready disassembly. Other specific objects and advantages will appear as the specification proceeds.

The invention is shown, in an illustrative embodiment, by the accompanying drawing, in which—

Figure 1 is a perspective view of a pail equipped with a nipple and a nipple-supporting structure embodying my invention; Fig. 2, a broken, vertical sectional view on an enlarged scale; and Fig. 3, a vertical, sectional view of the ferrule employed.

In the illustration given, 10 designates a pail equipped with a handle 11. The pail is provided with a circular opening 12 near the bottom of the pail. It will be understood that any suitable type of pail may be employed.

A ferrule 13 is provided on its inner side with a flange 14 and with a barrel portion 15 having threads 16 at its forward end portion. A large nut 17 is threaded to engage the threads 16 of ferrule 13, the nut being preferably formed of composition material which is extremely tough and sturdy for locking the ferrule upon the container 10. Between the flange 14 and the inner wall of the container 10, I prefer to insert an annular resilient gasket 18 to form a leakproof seal between the flange 15 and the inner wall of pail 10.

A nipple 19 of rubber or resilient material and provided at its forward tip with a slit 20, is extended through the bore of the ferrule 13, as shown more clearly in Fig. 2. The nipple is preferably provided at its rear end with a double bead. There is an outwardly-extending bead 21 which extends upwardly to seal the nipple with respect to the ferrule 13, and a downwardly-extending nipple 22 for sealing the nipple with respect to a drain tube or gooseneck tube 23.

The gooseneck tube 23 may be formed of composition material or of any suitable material, and is provided with a depending portion 24 providing a passage extending almost to the bottom of the pail. Integrally formed with the portion 24 is a forwardly-extending valve chamber portion 25 having inwardly-extending bead portions 26 for confining the ball valve 27 within the valve chamber 28. The valve chamber 28 communicates with the vertical passage in the portion 23 through the port 29. The horizontal portion 25 is also provided with an annular bead 30 near the forward end of the gooseneck portion 25 and adapted to extend upwardly and behind the bead 22 of nipple 19, thus holding the nipple 19 firmly in position.

In the use of the pail, it is of great importance to be able to remove the nipple frequently for quick cleaning and to bring it back quickly into place or to replace it with a new nipple. For this operation, I find that it is of great importance that the ferrule 13 be provided with inwardly-tapering portions, as shown more clearly in Fig. 3. For example, there is on the inner side a relatively large diameter section 13 and at the forward side of the nipple there is a relatively small diameter portion 32. Between the portions 31 and 32 is a section 33 of intermediate diameter. Thus, when the nipple is drawn into place, the forward end of the nipple is engaged with the inwardly-extending rib 34, while the mouth of the nipple tapers to wider diameters, as illustrated in Fig. 2. With this structure, the nipple may be drawn inwardly to free it from the ferrule 13 so that the user may quickly clean and then replace the nipple. In the first operation, the gooseneck member 23 may first be removed from the nipple 19 before the nipple is drawn rearwardly. In the reassembly, I prefer to insert the gooseneck member within the nipple 19 bringing the annular bead 30 to the inner side of the depending bead 22 of nipple 19 and the nipple may be drawn forwardly through the ferrule so as to anchor the bead 30 within the nipple 19 and to the outer side of the bead 22, while also forcing the upper bead into sealing relation with the ferrule 13. The assembly apparatus is effective in draining all the liquid from the bottom of the pail. The assembly preferred stiffens the pail and the nut 17 provides a buffer which is effective against the butting action of the calf, while at the same time preventing injury to the calf. The entire assembly can be shipped knocked down, with the parts thereof in nesting relation, while at the same time they may be quickly assembled without tools to form a sturdy combination with the pail 10, stiffening the pail at the point where the pail is weakened by the forming of the opening 12. In the gooseneck structure, the outer bead 30 prevents the assembly from pulling through, while the inner bead 26 is effective in keeping the valve in place. By having the ferrule with the inner bore tapering, as illustrated, or using several bores of different diameters increasing in length toward the inner side of the ferrule, I provide a structure in which the nipple is securely held and will not pull forwardly, while at the same time wedging of the nipple is avoided and it is possible to remove the gooseneck and draw the nipple inwardly for cleaning without disassembling the ferrule and supporting structure. The tapering inner diameter of the ferrule provides ledges or shoulders which prevent the drawing of the nipple outwardly under the tugging of the calf, while at the same time this structure enables the operator to draw the nipple rearwardly to remove it without detaching the ferrule and assembled parts.

While in the foregoing specification I have shown a structure illustrating the invention in considerable detail for the purpose of presenting one embodiment of the invention, it will be understood that such details of structure may be varied widely by those skilled in the art without departing from the spirit of my invention.

I claim:

1. In a feeder pail equipped near the bottom of the pail with an opening, a ferrule having on the inner side thereof an upwardly-extending flange, an annular resilient gasket between said flange and the wall of the pail, said ferrule having a barrel portion extending forwardly and threaded along its forward portion and having portions of differing diameter forming a passage through the ferrule, the diameters becoming narrower as they approach the forward end of the ferrule, a nut engaging the threaded portion of said ferrule to clamp said gasket between said flange and the wall of the pail buttressed by said nut, a nipple having a beaded inner end and a slit outer end extending through said ferrule, and a gooseneck tube having an external bead interlocking with the bead of said nipple within the passage of said ferrule, said gooseneck tube being provided with a bail check valve.

2. The structure of claim 1, in which the nipple is provided with a double bead at its inner end.

3. The structure of claim 1, in which the gooseneck tube is provided with an outer bead and an inner bead, said inner bead serving to maintain the bail valve therein.

4. In a feeder pail having an opening near the bottom thereof, a gooseneck tube having an internal seat, a ball in said tube and engageable with said seat when back pressure is exerted on said conduit to close said conduit, a ferrule extending through said opening in the feeder pail and provided at its inner end with an outwardly-extending flange and at its outer side with an externally threaded portion, a gasket between said flange and the inner side of the pail wall, a nut threaded to engage the threads of said ferrule and to clamp said gasket between said flange and said pail wall, a nipple extending through said ferrule and having its inner portion receiving one end of said gooseneck tube and urged thereby against said ferrule, and releasable means at one end of said gooseneck tube adjacent said ball for releasably confining said ball within said tube.

5. The structure of claim 4, in which the ferrule has an outer portion of relatively narrow diameter adapted to receive the nipple and portions of increasing diameter extending inwardly of said first-mentioned portion for receiving a flared mouth portion of said nipple.

References Cited in the file of this patent

UNITED STATES PATENTS

| Number | Name | Date |
|---|---|---|
| 886,485 | Espy | May 5, 1908 |
| 1,972,375 | Coyner | Sept. 4, 1934 |
| 2,535,158 | Rhinehart | Dec. 26, 1950 |
| 2,535,159 | Rhinehart | Dec. 26, 1950 |